US012656322B2

(12) United States Patent
Yaeguchi

(10) Patent No.: US 12,656,322 B2
(45) Date of Patent: Jun. 16, 2026

(54) UNIT-TYPE ANALYZER

(71) Applicant: SHIMADZU CORPORATION, Kyoto (JP)

(72) Inventor: Naoki Yaeguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 749 days.

(21) Appl. No.: 17/980,884

(22) Filed: Nov. 4, 2022

(65) Prior Publication Data

US 2023/0243785 A1     Aug. 3, 2023

(30) Foreign Application Priority Data

Jan. 31, 2022     (JP) ................................. 2022-012610

(51) Int. Cl.
*G01N 30/28* (2006.01)
*G01N 30/02* (2006.01)
*G01N 30/30* (2006.01)

(52) U.S. Cl.
CPC ....... *G01N 30/28* (2013.01); *G01N 2030/027* (2013.01); *G01N 2030/3084* (2013.01)

(58) Field of Classification Search
CPC .... G01N 30/8658; G01N 30/06; G01N 30/16; G01N 2030/025; G01N 30/88; G01N 2030/8804
See application file for complete search history.

(56) References Cited

U.S. PATENT DOCUMENTS

2015/0331401 A1* 11/2015 Yokoi .............. G01N 35/00712
                                                   700/83
2017/0146500 A1* 5/2017 Kanazawa ............. G01N 30/88
2020/0033929 A1* 1/2020 Yokoi .............. G01N 35/00871
2021/0313162 A1* 10/2021 Spreadbury ........ G01N 30/7233
2022/0146541 A1     5/2022 Takahashi

FOREIGN PATENT DOCUMENTS

CN          105095640 A     11/2015
CN          110476061 A     11/2019
WO          2020/183597 A1   9/2020

OTHER PUBLICATIONS

First Office Action dated Aug. 19, 2025 issued for the corresponding Japanese Patent Application No. 2022-012610, with machine translation.
Office Action for the corresponding Chinese Patent Application No. 202211470888.6 dated Apr. 11, 2026, with English machine translation.

* cited by examiner

*Primary Examiner* — Bradley R Spies
*Assistant Examiner* — Jeannine McDermott
(74) *Attorney, Agent, or Firm* — Renner, Otto, Boisselle & Sklar, LLP

(57) ABSTRACT

Provided is a unit-type analyzer (1) including: a system controller (80); a plurality of analyzing units (60), with each analyzing unit including a main power switch (70) configured to turn on and off electric power to the analyzing unit, and a software switch (66) provided separately from the main power switch configured to turn on and off a communication with the system controller; and a software-switch operation-mode setter (65) configured to perform a setting for enabling or disabling an operation on the software switch included in each analyzing unit.

8 Claims, 3 Drawing Sheets

Fig. 4

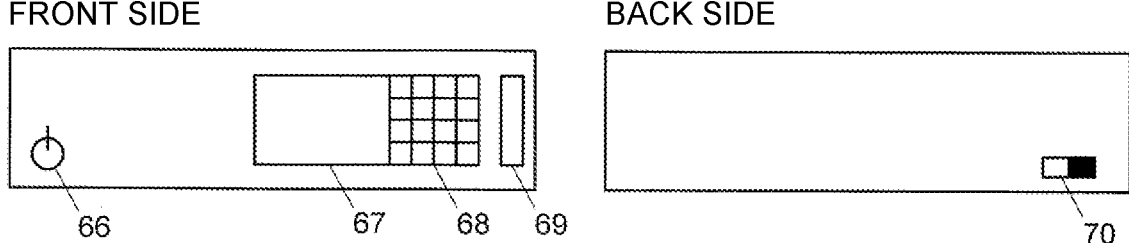

FRONT SIDE                           BACK SIDE 66            67      68    69                              70

Fig. 5

Power-Saving Mode Settings

Cool-Down Time    | XXX |  min

☑ Liquid-Sending Unit
  Stop liquid-sending pumps

☐ Autosampler
  Stop temperature-control mechanism

☑ Column Oven
  Stop temperature-control mechanism

☐ Absorbance Detector
  ☑ · Turn off the lamp
  ☐ · Stop temperature-control mechanism ☐ Differential Refractive Index Detector
  ☑ · Turn off the lamp
  ☐ · Stop temperature-control mechanism

UNIT-TYPE ANALYZER

TECHNICAL FIELD

The present invention relates to a unit-type analyzer, such as a liquid chromatograph.

BACKGROUND ART

Liquid chromatographs have been commonly used for qualitative or quantitative determination of components contained in liquid samples. In a liquid chromatograph, a liquid sample is introduced into a column by a flow of a mobile phase supplied at a predetermined flow rate. The components in the sample are separated from each other in the column and individually subjected to a measurement.

Liquid chromatographs can be divided into an integrated type and a unit type which consists of a plurality of units (also called "modules") combined together. An integrated type of liquid chromatograph includes a measurement section, system controller and power source in an integrated form. The measurement section includes a liquid-sending section, sample injector, column and detector. The system controller sends control signals for operating the measurement section. The power source supplies the measurement section and the system controller with electric power.

A unit-type liquid chromatograph includes: a liquid-sending unit having a pump for drawing a mobile phase from a mobile phase container and sending it to the column; an injector for injecting a liquid sample into the mobile phase; a column oven for heating the column; and a detector unit for detecting components in the mobile phase exiting from the column. It is often the case that the liquid chromatograph is additionally provided with an autosampler configured to hold a plurality of samples prepared beforehand and automatically put one sample after another into the injector.

The aforementioned components are provided in the form of individual units to be connected to the system controller. The system controller is connected to a workstation (control computer) on which dedicated software is installed. According to the instructions from the workstation, the system controller sends control signals to each of the aforementioned units (other than the system controller itself, which is often provided in the form of a unit). Each unit has a main power switch and a software switch. The software switch is a switch to be operated for causing the unit to go into the power-saving mode or return to the normal operation mode from the power-saving mode. This switch is normally located on the front side of the unit. On the other hand, the main power switch is a switch to be operated for turning on and off the power supply to the unit. This switch is operated in special situations, such as the installation of the unit. Therefore, in order to prevent incorrect operations, this switch is located in an inaccessible area, such as the back side or bottom side of the unit.

Patent Literature 1 describes a unit-type liquid chromatograph in which a unit can be made to go into the power-saving mode or return to the normal operation mode from the power-saving mode without requiring an operation on the software switch. When a unit is connected to the system controller, operations on the software switch of the unit are disabled so as to give the system controller an exclusive control of the software switch. In the liquid chromatograph, when a unit should go into the power-saving mode, the system controller sends a predetermined control signal to that unit. Upon receiving the control signal, the target unit causes the main section which performs a measurement operation (e.g., the pump in the liquid-sending unit) to go into the power-saving mode. At a later point in time, when the target unit has once more received a predetermined control signal from the system controller, the same unit causes the main section to return to the normal operation mode from the power-saving mode. That is to say, the "power-saving" mode in this system is an operation mode for reducing the power consumption by the main section while maintaining the communication with the system controller (this type of operation mode may also be called the "sleep" or "shutdown" state).

In the unit-type liquid chromatograph, the system controller recognizes the types and numbers of units which have already been incorporated in the liquid chromatograph at that time (i.e., the units in which the main power switches have been turned on and the communications with the system controller have been established), by communicating with the individual units. When the measurement conditions have been set by an analysis operator on the control computer, those measurement conditions are sent to the system controller. The system controller checks whether or not the configuration of the units corresponding to the received measurement conditions is identical with that of the units which have been incorporated in the liquid chromatograph (and have established communications with the system controller), and carries out the measurement when the two configurations are identical. On the other hand, when the two configurations are not identical, the system controller sends a message reporting the situation to the control computer, which prompts the analysis operator to check the configuration of the units and the measurement conditions.

CITATION LIST

Patent Literature

Patent Literature 1: WO 2020/183597 A

SUMMARY OF INVENTION

Technical Problem

In liquid chromatographs, various types of detectors are used depending on the characteristics of the samples to be analyzed, such as an absorbance detector, fluorescent detector, differential refractive index detector or electric conductivity detector. Each of these types of detectors is provided in the form of a unit, and a unit containing the detector that should be used in the measurement is incorporated in the liquid chromatograph. As explained earlier, when a measurement using a conventional liquid chromatograph is performed, the detector unit corresponding to the measurement conditions needs to be already incorporated and have communications established with the system controller. One method for changing the detector in the conventional liquid chromatograph is to entirely replace the detector unit used in the previous measurement with the detector unit to be used in the next measurement. In another method, both of the two detector units are previously connected to the system controller by cables, and the main power switch of the detector unit used in the previous measurement is turned off to block its communication with the system controller, whereafter the main power switch of the detector unit to be used in the next measurement is turned on to establish its communication with the system controller. The former case requires time and labor for the task of changing the cable connections between the system controller and the detector unit. The latter case does not require the task of changing the cable connections between the system controller and the detector unit. However, in the latter case, the user needs to perform the troublesome task of reaching an inaccessible area, such as an area behind or beneath the unit, and manually operating the main power switch. Although the descriptions thus far have been concerned with detector units, the previously described problem similarly occurs with other types of units. Thus, the conventional liquid chromatograph has the problem that it is necessary to perform a time-and-labor consuming task or troublesome task when changing the configuration of the units. Additionally, depending on the installation environments, it may be impossible for the analysis operator to enter the area behind the system where the main power switch is located. Furthermore, the analysis operator who has entered the area behind the liquid chromatograph may carelessly cause some of the cables between the units to be disconnected. In that case, the cable connections between the units in the liquid chromatograph must be correctly restored. However, an analysis operator who has not been trained for the installation and other related tasks may incorrectly connect the cables, which may cause serious problems, such as an analysis being prevented from being performed as intended.

The problem to be solved by the present invention is to provide a unit-type analyzer in which the configuration of the units to be used in the measurement can be conveniently changed.

Solution to Problem

The unit-type analyzer according to the present invention developed for solving the previously described problem includes:
   a system controller;
   a plurality of analyzing units, with each analyzing unit including a main power switch configured to turn on and off electric power to the analyzing unit, and a software switch provided separately from the main power switch and configured to turn on and off a communication with the system controller; and
   a software-switch operation-mode setter configured to perform a setting for enabling or disabling an operation on the software switch included in each analyzing unit.

Advantageous Effects of Invention

The analyzer according to the present invention includes a system controller, a plurality of analyzing units to be connected to the system controller and a software-switch operation-mode setter. When a measurement using this analyzer is to be performed, an analysis operator checks whether or not a communication has been established between the system controller and each of the analyzing units to be used for the measurement. When the communication with any one of those analyzing units has not been established, the analysis operator enables the operation on the software switch in the analyzing unit concerned by the software-switch operation-mode setter, and subsequently operates the software switch of the same analyzing unit to establish its communication with the system controller. For an analyzing unit which will not be used in the measurement, the analysis operator similarly enables the operation on the software switch in the analyzing unit concerned by the software-switch operation-mode setter, and subsequently operates the software switch of the same analyzing unit to block its communication with the system controller.

The analyzer according to the present invention allows the user to conveniently change the configuration of each analyzing unit by simply establishing a communication with the system controller by operating the software-switch operation-mode setter and the software switch (or blocking the communication between an unused analyzing unit and the system controller by operating the software switch of the same unit), without requiring the cable connections between the analyzing units and the system controller to be changed or requiring a manual operation of the main power supply of an analyzing unit located in an area that is inaccessible for manual operation. A skillful operator can perform a setting for enabling an input operation on the software switch when a measurement using a different combination of analyzing units is to be performed, or a setting for disabling an input operation on the software switch when a measurement using a previously determined combination of the analyzing units is to be performed by an insufficiently skilled operator. By this setting, an incorrect operation of the software switch by an insufficiently skilled operator can be avoided.

BRIEF DESCRIPTION OF DRAWINGS

FIG. 4 is a diagram illustrating the front and back sides of an analyzing unit in the liquid chromatograph according to the present embodiment.

FIG. 5 is an example of the setting screen for the power-saving mode in the present embodiment.

DESCRIPTION OF EMBODIMENTS

Figure 1:
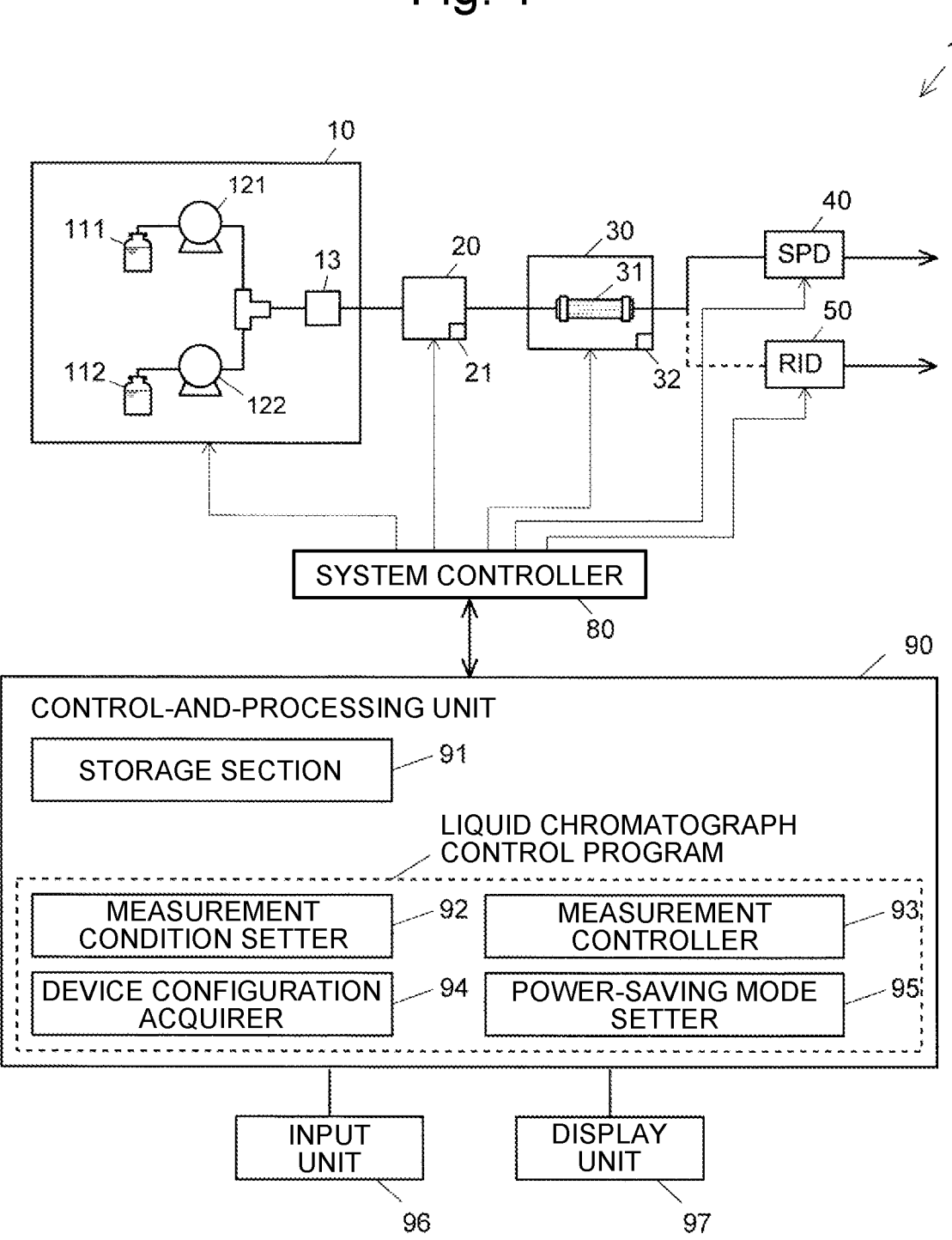
FIG. 1 is a configuration diagram of the main components of a liquid chromatograph as one embodiment of the analyzer according to the present invention.

A liquid chromatograph as one embodiment of the analyzer according to the present invention is hereinafter described referring to the drawings.

FIG. 1 is a diagram showing the configuration of the main components of the liquid chromatograph 1 according to the present embodiment. This liquid chromatograph 1 includes a liquid-sending unit 10, autosampler 20, column oven 30, absorbance detector (labelled "SPD" in FIG. 1) 40, differential refractive index detector (labelled "RID" in FIG. 1) 50, system controller 80, and control-and-operation unit 90.

The liquid-sending unit 10 includes containers 111 and 112 holding solutions for the mobile phase, liquid-sending pumps 121 and 122 for drawing and sending the solutions from the containers 111 and 112, as well as a mixer 13 for mixing two kinds of solutions. A mobile phase prepared in the liquid-sending unit 10 is introduced through the autosampler 20 into a column 31 in the column oven 30.

The autosampler 20 has a plurality of sample-container placement sections, on each of which a sample container holding a liquid sample to be analyzed or a standard sample is to be placed. In the autosampler 20, the liquid samples are sequentially collected from the sample containers in a predetermined order according to the set measurement conditions, and the collected liquid sample or a standard sample is injected into the mobile phase supplied from the liquid-sending unit 10. In order to prevent the liquid samples from vaporization or degeneration, the inner space of the autosampler 20 is maintained at a predetermined temperature by a temperature regulator 21 (typically, a cooling device).

The column oven 30 includes a column 31 and a temperature regulator 32 for controlling the temperature of the column 31 based on the set measurement conditions. While passing through the column 31, the components in the sample are separated from each other. Each component of the sample which has exited from the column 31 is introduced into the absorbance detector 40 or differential refractive index detector 50.

The absorbance detector 40 includes a flow cell into which a sample component exiting from the column 31 is to be introduced, a light source for delivering a beam of light with a predetermined range of wavelengths into the flow cell, a light-dispersing element for separating the light transmitted through the flow cell into wavelength components, a photodiode array detector for detecting the components of light after the wavelength separation, and a temperature regulator for maintaining the inside of the detector at a predetermined temperature. In a measurement using the absorbance detector 40, each sample component can be detected and quantified based on the absorption of light at specific wavelengths which vary depending on the kind of sample component.

The differential refractive index detector 50 includes: a flow cell having a sample cell into which a sample component exiting from the column 31 is to be introduced and a reference cell into which a reference sample is to be introduced; a light source for delivering a beam of slit light with a specific wavelength into the flow cell; a photodetector for detecting light transmitted through the flow cell; and a temperature regulator for maintaining the inside of the detector at a predetermined temperature. In the differential refractive index detector 50, the optical path of the light emitted from the light source changes when the light passes through the boundary between the sample cell and the reference cell, due to the refraction whose magnitude depends on the difference in refractive index between the reference solution and the sample solution. When a sample component flows from the column 31 into the sample cell, a shift occurs in the position of the slit image formed on the light-receiving element of the photodetector. In a measurement using the differential refractive index detector 50, the sample component can be detected and quantified based on the magnitude of this shift.

Figure 2:
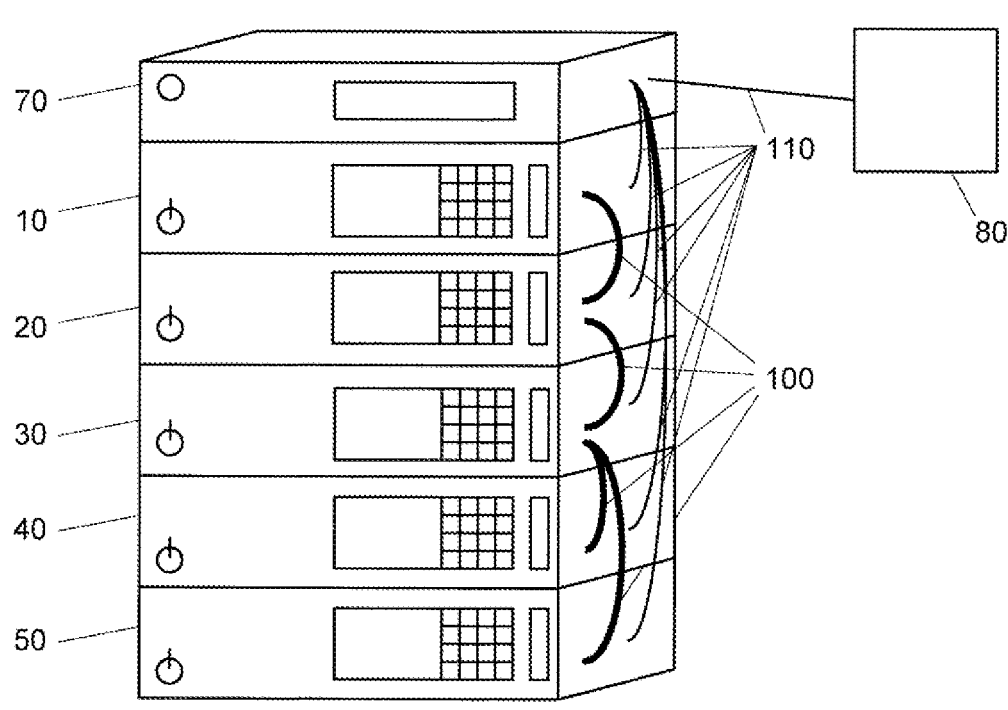
FIG. 2 is a diagram illustrating the units of the liquid chromatograph according to the present embodiment.

As shown in FIG. 2, the liquid-sending unit 10, autosampler 20, column oven 30, absorbance detector 40 and differential refractive index detector 50 are provided in the form of units, with each device contained in an independent housing. In the following description, the liquid-sending unit 10, autosampler 20, column oven 30, absorbance detector 40 and differential refractive index detector 50 may be collectively called "analyzing units 60" when those devices do not need to be specifically discriminated. The system controller 80 is also provided in the form of a unit. Liquid-sending passages 100 connect the liquid-sending unit 10 and the autosampler 20, the autosampler 20 and the column oven 30, the column oven 30 and the absorbance detector 40, as well as the column oven 30 and the differential refractive index detector 50. Communication cables 110 connect the control-and-processing unit 90 and the system controller 80 as well as the system controller 80 and each analyzing unit 60.

The control-and-processing unit 90 includes, in addition to a storage section 91, a measurement condition setter 92, measurement controller 93, device configuration acquirer

94, and power-saving mode setter 95 as its functional blocks. The storage section 91 holds measurement conditions to be used for measurements of various kinds of sample components, necessary information for the settings of the power-saving mode, and other pieces of information. The storage section 91 is also used to save data acquired through a measurement of a liquid sample as well as the result of an analysis of the data and other pieces of data. The control-and-processing unit 90 is actually a personal computer (or workstation), on which the aforementioned functional blocks are embodied by executing a liquid chromatograph control program previously installed on the same computer. An input unit 96 including a keyboard and a mouse, as well as a display unit 97 are connected to the control-and-processing unit 90.

Figure 3:
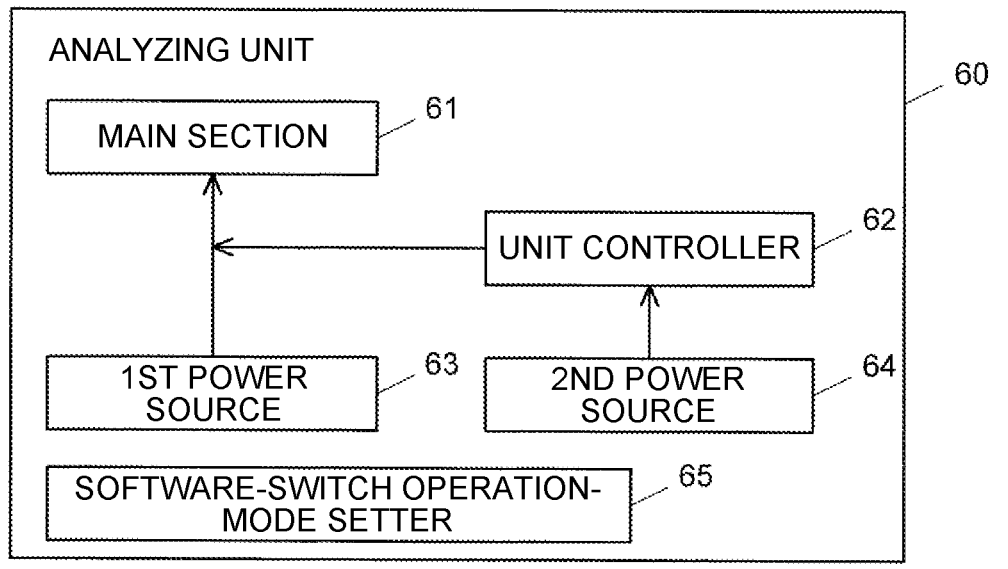
FIG. 3 is a configuration diagram of the main components of an analyzing unit in the liquid chromatograph according to the present embodiment.

FIG. 3 is a block diagram showing the configuration of each analyzing unit 60. Each analyzing unit 60 includes a main section 61, unit controller 62, first power source 63, second power source 64 and software-switch operation-mode setter 65. The main section 61 corresponds to the main operating section in the analyzing unit 60. For example, in the case of the liquid-sending unit 10, the main section 61 includes the liquid-sending pumps 121 and 122 as well as the mixer 13 which are used for supplying the mobile phase. In the case of the autosampler 20, the main section 61 includes the temperature regulator 21 of the autosampler 20 and the driver of the sampling needle for collecting a sample. In the case of the column oven 30, the main section 61 includes the temperature regulator 32 for controlling the temperature of the column 31. In the case of the absorbance detector 40 or the differential refractive index detector 50, the main section 61 includes the light source, spectroscopic detector and temperature regulator.

The main section 61 is supplied with electric power from the first power source 63. The first power source 63 in the present embodiment has a power output of 24 V, while the second power source 64 has a power output of 5 V. The power outputs of those power sources may be appropriately determined taking into account the actual form of the main section 61 and the unit controller 62. Since the unit controller 62 is actually a processor (and other related devices), a power source having a lower power output than the first power source 63 can be used as the second power source 64.

The unit controller 62 has a processor and a memory. The processor controls the operation of the main section 61 according to a command given from the outside. The processor also turns on and off the power supply from the first power source 63 to the main section 61. The unit controller 62 is also responsible for the communication with the system controller 80. The unit controller 62 is supplied with electric power from the second power source 64. An operation mode in which the power supply to the main section 61 is in the ON state is called the "normal mode", while an operation mode in which the power supply to the main section 61 is in the OFF state is called the "power-saving mode" (or shutdown mode or sleep mode).

Whether the software-switch operation-mode setter 65 should be enabled or disabled can be set (or changed) by using an operation panel 68 shown in FIG. 4. In the enabled state, the software switch 66 can be operated even in the middle of the communication with the system controller 80. In the disabled state, the software switch 66 cannot be operated in the middle of the communication with the system controller 80.

As shown in FIG. 4, the software switch 66, display 67, operation panel 68 and indicator 69 are provided on the front side of each analyzing unit 60. A main power switch 70 is provided on the back side of the analyzing unit 60. The main power switch 70 is used for turning on and off the power supply to the entire analyzing unit 60. Turning off the main power switch 70 discontinues the power supply from the first power source 63 to the main section 61 as well as the power supply from the second power source 64 to the unit controller 62. Consequently, the analyzing unit 60 stops all operations (i.e., the operation of the main section 61 and that of the unit controller 62). The communication with the system controller 80 is also blocked. The "software switch" is a switch for turning on and off the power supply from a portion of the power sources and thereby turning on and off a portion of the functions in the analyzing unit.

The software switch 66 has the function of turning on and off the communication with the system controller 80 when its button is pressed, and the function of showing the state of the analyzing unit 60 by the display state of the button, as will be hereinafter described.

When the button of the software switch 66 is shown (lighted), it indicates that the input operations (button-pressing operation) on the software switch 66 is enabled. When the button of the software switch 66 is not shown (not lighted), it indicates that the input operation (the button-pressing operation) on the software switch 66 is disabled. This means that the communication between the analyzing unit 60 concerned and the system controller 80 is in the ON state, or that the main switch 70 is turned off and the power supply to the analyzing unit 60 is halted. The software switch 66 can be lighted in white or red. The software switch 60 lighted in white indicates that the communication with the system controller 80 is in the ON state. The software switch 60 lighted in red indicates that the communication with the system controller 80 is in the OFF state. The system controller 80 may also be provided with a similar button of the software switch 66 whose light is either turned on to indicate that the input operation on the software switch 66 is enabled when the system controller 80 is not communicating with the control-and-processing unit 90 or is turned off to indicate that the input operation on the software switch 66 is disabled when the system controller 80 is communicating with the control-and-processing unit 90.

The indicator 69 has the function of displaying the operation mode of the analyzing unit 60. The indicator 69 can be lighted in the three colors of green, red and gray. The indicator 69 lighted in green indicates that the operation mode of the analyzing unit 60 is in the normal mode. The indicator 69 lighted in red indicates that the operation mode of the analyzing unit 60 is in the sleep mode. The indicator 69 lighted in gray indicates that the operation mode of the analyzing unit 60 is in the shutdown mode.

Next, a procedure of an analysis of liquid samples using the liquid chromatograph 1 according to the present embodiment is described. In the present example, a measurement using the absorbance detector 40 is initially performed for liquid samples which have been set in the autosampler 20, followed by a measurement using the differential refractive index detector 50. It is assumed that the communication with the system controller 80 is initially in the ON state for all analyzing units 60, and each analyzing unit 60 is operating in the normal mode. The system controller 80 is communicating with the control-and-processing unit 90. In all analyzing units 60, the software switch 66 is not lighted, and the indicator 69 is lighted in green.

An analysis operator performs a predetermined operation through the input unit 96 to issue a command for initiating the task of setting of the measurement conditions for the liquid samples. The measurement condition setter 92 reads the measurement conditions saved in the storage section 91 and displays them on the screen of the display unit 97. The analysis operator checks the displayed measurement conditions and modifies them as needed. After the measurement conditions have been determined, the measurement condition setter 92 creates a method file in which those measurement conditions are described, and saves the same file in the storage section 91. In the present example, the measurement conditions for the first measurement using the absorbance detector 40, and the measurement conditions for the second measurement using the differential refractive index detector 50, are individually set, and two method files 1 and 2 which respectively correspond to the two sets of measurement conditions are saved in the storage section 91.

The analysis operator subsequently performs a predetermined operation to issue a command to initiate the first measurement. The measurement controller 93 reads method file 1 saved in the storage section 91 and determines the configuration of the analyzing units 60 required for performing the first measurement (i.e., the liquid-sending unit 10, autosampler 20, column oven 30 and absorbance detector 40).

After the configuration of the analyzing units 60 required for performing the measurement has been determined by the measurement controller 93, the device configuration acquirer 94 sends the system controller 80 a control signal which instructs the same controller 80 to check the state of the connection of each analyzing unit 60. The system controller 80 sends a predetermined command to each analyzing unit 60. Upon receiving this command, each analyzing unit 60 returns a response representing its operation state to the system controller 80. The system controller 80 identifies the analyzing unit 60 which has returned this response and sends the control-and-processing unit 90 a piece of information which shows the operation state (normal mode or power-saving mode) of the identified analyzing unit 60. Based on the information from the system controller 80, the control-and-processing unit 90 recognizes the state of each analyzing unit 60 (the ON/OFF state of the communication with the system controller 80, and the operation mode) and identifies the analyzing units 60 incorporated in the liquid chromatograph 1.

After the analyzing units 60 which are incorporated in the liquid chromatograph 1 at the moment have been identified by the device configuration acquirer 94, the measurement controller 93 determines whether or not the liquid chromatograph 1 satisfies the conditions for the execution of the first measurement ("first measurement state"). Specifically, the measurement controller 93 should confirm that the communications of the liquid-sending unit 10, autosampler 20, column oven 30 and absorbance detector 40 with the system controller 80 are in the ON state, and that these analyzing units 60 are operating in the normal mode while the other units (in the present situation, the differential refractive index detector 50) are not incorporated in the liquid chromatograph 1 (i.e., their communications with the system controller 80 are in the OFF state).

As noted earlier, at the beginning, the communication with the system controller 80 is in the ON state in all analyzing units 60, and these units 60 are operating in the normal mode. Therefore, the liquid chromatograph 1 is not in the first measurement state. Specifically, the communication between the differential refractive index detector 50 and the system controller 80 is in the ON state. When the state of the liquid chromatograph 1 is not identical with the first measurement state, the measurement controller 93 shows the current state of each analyzing unit 60 on the screen of the display unit 97 and highlights the portion which differs from the first measurement state (in the present example, the communication of the differential refractive index detector 50 with the system controller 80 is in the ON state, and therefore, this detector is incorporated in the liquid chromatograph 1), to prompt the analysis operator to check the situation. The highlighting can be achieved by any appropriate method, such as the use of a different display color or the blinking of the portion in question.

Checking the screen showing the fact that the state of the liquid chromatograph 1 is not identical with the first measurement state, the analysis operator changes the setting of the software-switch operation-mode setter 65 so as to enable the input operation on the software switch 66 of the differential refractive index detector 50. With this change of the settings, the software switch 66 is lighted in white. In this state, the analysis operator presses the software switch 66, whereby the communication with the system controller 80 is turned off, and the lighting color of the software switch 66 of the differential refractive index detector 50 is changed from white to red. Thus, the first measurement state is achieved. After the software switch 66 has been pressed, the setting of the software-switch operation-mode setter 65 may be changed so as to disable the input operation on the software switch 66 of the differential refractive index detector 50.

The analysis operator once more issues a command to initiate the first measurement. The device configuration acquirer 94 once more acquires the state of each analyzing unit 60 incorporated in the liquid chromatograph 1. After confirming that the acquired state is identical with the first measurement state, the measurement controller 93 initiates the measurement of liquid samples according to the measurement conditions described in method file 1. The procedure of the measurement itself is similar to that of a conventional measurement, and therefore, will not be described in detail.

After the completion of the first measurement, the measurement controller 93 saves the data acquired by the first measurement in the storage section 91 and shows information telling the completion of the measurement on the screen of the display unit 97. The analysis operator recognizes this information and subsequently issues a command to initiate the second measurement.

Upon receiving the command to initiate the second measurement, the measurement controller 93 reads method file 2 saved in the storage section 91 and determines the configuration of the analyzing units 60 required for performing the second measurement (i.e., the liquid-sending unit 10, autosampler 20, column oven 30 and differential refractive index detector 50).

After the configuration of the analyzing units 60 required for performing the measurement has been determined by the measurement controller 93, the device configuration acquirer 94 acquires the state of each analyzing unit 60 incorporated in the liquid chromatograph 1. The measurement controller 93 subsequently determines whether or not the liquid chromatograph 1 satisfies the conditions for the execution of the second measurement ("second measurement state"). Specifically, the measurement controller 93 should confirm that the communications of the liquid-sending unit 10, autosampler 20, column oven 30 and differential refractive index detector 50 with the system controller 80 are in the ON state, and that these analyzing units 60 are operating in the normal mode while the other analyzing units 60 (in the present situation, the absorbance detector 40) are not incorporated in the liquid chromatograph 1 (i.e., their communications with the system controller 80 are in the OFF state).

At this point, the liquid chromatograph 1 is in the first measurement state. Accordingly, the measurement controller 93 determines that the state of the liquid chromatograph 1 is not identical with the second measurement state. It shows the current state of each analyzing unit 60 on the screen of the display unit 97 and highlights the portion which differs from the second measurement state (in the present example, the communication of the absorbance detector 40 with the system controller 80 is in the ON state, and therefore, this detector is incorporated in the liquid chromatograph 1, while the communication of the differential refractive index detector 50 with the system controller 80 is in the OFF state, and therefore, this detector is not incorporated in the liquid chromatograph 1), to prompt the analysis operator to check the situation.

Checking the screen showing the fact that the state of the liquid chromatograph 1 is not identical with the second measurement state, the analysis operator changes the setting of the software-switch operation-mode setter 65 so as to enable the input operation on the software switch 66 of the absorbance detector 40. With this change of the settings, the software switch 66 is lighted in white. In this state, the analysis operator presses the software switch 66, whereby the communication with the system controller 80 is turned off, and the lighting color of the software switch 66 of the absorbance detector 40 is changed from white to red. The analysis operator subsequently presses the software switch 66 of the differential refractive index detector 50. In the case where the setting of the software-switch operation-mode setter 65 was changed so as to disable the input operation on the software switch 66 of the differential refractive index detector 50 when the first measurement state was achieved, this setting should be changed once more to enable the input operation on this software switch 66 before this switch is pressed. The communication with the system controller 80 is thereby turned on, and the lighting color of the software switch 66 of the differential refractive index detector 50 is changed from red to white. Thus, the second measurement state is achieved.

The analysis operator once more issues a command to initiate the second measurement. The device configuration acquirer 94 once more acquires the state of each analyzing unit 60 incorporated in the liquid chromatograph 1. After confirming that the state is identical with the second measurement state, the measurement controller 93 initiates the measurement of liquid samples according to the measurement conditions described in method file 2. The data acquired by the measurement is saved in the storage section 91. Thus, both the first and second measurements are completed.

In the case of a conventional liquid chromatograph, one method for changing the detector in the conventional liquid chromatograph is to entirely replace the detector unit used in the previous measurement with the detector unit to be used in the next measurement. In another method, both of the two detector units are previously connected to the system controller by cables, and the main power switch of the detector unit used in the previous measurement is turned off to block its communication with the system controller, whereafter the main power switch of the detector unit to be used in the next measurement is turned on to establish its communication with the system controller. The former case requires time and labor for the task of changing the cable connections between the system controller and the detector unit. In the latter case, the user needs to perform the troublesome task of reaching an inaccessible area, such as an area behind or beneath the unit, and manually operating the main power switch.

By comparison, the liquid chromatograph 1 according to the present embodiment conveniently allows its configuration to be changed by simply pressing the software switch 66 of one or more analyzing units 60 to turn on/off the communication of each unit with the system controller 80.

If no measurement is scheduled for a certain period of time after the completion of the first and second measurements, the analyzing units 60 can be made to go into the power-saving mode as follows.

For an analysis unit 60 which should be made to operate in the power-saving mode, the analysis operator initially turns on its communication with the system controller 80. Since the current state is the second measurement state, the analysis operator presses the software switch 66 of the absorbance detector 40 to turn on its communication with the system controller 80. The analysis operator subsequently performs a predetermined operation through the input unit 96 to issue a command for initiating the setting of the power-saving mode. The device configuration acquirer 94 identifies the analyzing units 60 currently incorporated in the liquid chromatograph 1 (i.e., the units whose communications with the system controller 80 are in the ON state). Subsequently, the power-saving mode setter 95 displays, on the display unit 97, a screen for setting specific contents of the power-saving mode for the analyzing units 60 identified by the device configuration acquirer 94.

FIG. 5 is one example of the screen displayed by the power-saving mode setter 95. This screen shows the names of the analyzing units 60 and the boxes for selecting the operations that should be made to go into the power-saving mode. Specifically, in the present example, the boxes for selecting the following operations are shown: the discontinuation of the supply of the mobile phase by the liquid sending pumps 121 and 122 in the liquid-sending unit 10, the control of the internal temperature by the temperature regulator 21 in the autosampler 20, the control of the temperature of the column 31 by the temperature regulator 32 in the column oven 30, the turning-off of the light source and the control of the internal temperature of the detector unit in the absorbance detector 40, as well as the turning-off of the light source and the control of the internal temperature of the detector unit in the differential refractive index detector 50.

In the example of FIG. 5, the selection box corresponding to the name of the analyzing unit is checked for the liquid-sending unit 10 as well as the column oven 30. This means that the liquid-sending unit 10 and the column oven 30 should go into the shutdown state in which the power supply to the main section 61 is turned off. On the other hand, in the case of the absorbance detector 40 and the differential refractive index detector 50, the checked boxes are not those corresponding to the name of the analyzing unit, but those corresponding to specific components of the main section 61 (the light source or temperature regulator). This means that those units should go into the sleep mode in which the power supply to those specific components of the main section 61 is turned off.

When any one of the selection boxes is checked by the analysis operator, the power-saving mode setter 95 shows, in the "cool-down time" field, the period of time for a preliminary (cool-down) process which requires the longest period of time among the preliminary processes to be performed for the checked operations before going into the power-saving mode. For example, the cool-down process for the liquid-sending unit 10 is a process in which the flow rate of the supply of the mobile phase by the liquid pumps 121 and 122 is gradually decreased to zero. The cool-down process for the autosampler 20, column oven 30, absorbance detector 40 and differential refractive index detector 50 is a process in which the power supply to the temperature regulators 21 and 32 is gradually decreased to zero. That is to say, the cool-down process is a process for the transition to the state in which no problem will arise when the power supply from the first power source 63 to each section that should go into the power-saving mode is discontinued.

After the content of the power-saving mode has been set, the analysis operator performs a predetermined operation, such as the pressing of the button for fixing the settings. Then, the power-saving mode setter 95 sends the system controller 80 a command for discontinuing the operation selected in each analyzing unit 60. Based on the command received, each analyzing unit 60 halts the operations indicated as the target of the power-saving mode. It also turns off the light of the software switch 66. In this state, the analyzing units 60 are only controllable through the system controller 80. Manual operations on the software switch 66 are disabled.

In the previously described example, the liquid-sending unit 10 and the column oven 30 go into the shutdown state, and the display color of their indicators 69 changes from green to gray. Meanwhile, the absorbance detector 40 and the differential refractive index detector 50 go into the sleep mode, and the display color of their indicators 69 changes from green to red. The autosampler 20 is still operating in the normal mode, so that the display color of its indicator 69 remains green.

When a predetermined operation is performed by the analysis operator to issue a command to restore the operations of the analyzing units 60 from the power-saving mode to the normal mode, the power-saving mode setter 95 instructs the system controller 80 to send each analyzing unit 60 a command to return to the normal mode. Upon receiving this command, each analyzing unit 60 exits the power-saving mode and initiates a start-up process. The start-up process is a process for making each analyzing unit 60 available for measurements (normal mode), such as an auto purge or warm up. Auto purge is a process in which a mobile phase is passed through the passages in the liquid chromatograph 1 to equilibrate the column 31.

In each analyzing unit 60 which has received the command for initiating the start-up process, the unit controller 62 turns on the power supply from the first power source 63 to the main section 61 (if the power supply to the main section 61 has been halted). After the start-up process has been completed, the analyzing unit 60 returns to the normal mode, enables the operation on the software switch 66, and lights this switch in white.

In the liquid chromatograph 1 according to the previous embodiment, when a specific type of measurement is routinely performed, it is unnecessary to change the combination of the analyzing units 60. In such a case, the operation on the software switch 66 may be maintained in the disabled state by a predetermined operation through the operation panel 68 of each analyzing unit 60. Disabling the operation on the software switch 66 in this manner is effective for preventing an insufficiently skilled operator from accidentally operating the software switch when conducting a measurement.

The previous embodiment is a mere example and can be appropriately changed along the gist of the present invention.

Although the absorbance detector 40 and the differential refractive index detector 50 are used as detector units in the previous embodiment, other detectors (e.g., a fluorescent detector or electric conductivity detector) may also be used. In the previous embodiment, a plurality of detector units are previously connected to the system controller 80 so as to change the detector to be included in the liquid chromatograph 1. A similar configuration can also be adopted for any other type of unit by previously connecting a plurality of units of this type so as to change the unit to be incorporated in the liquid chromatograph 1.

Although the previous embodiment is a liquid chromatograph, the previously described configuration can be similarly adopted in various types of analyzers capable of performing measurements with different combinations of units as in the previous embodiment.

In the previous embodiment, whether the operation on the software switch 66 is enabled or disabled is indicated by turning on or off the light of the software switch 66, and whether the communication with the system controller 80 is in the ON or OFF state is indicated by the lighting color. For these purposes, an indicator for showing those conditions may additionally be provided apart from the software switch 66. Although the setting for enabling or disabling the operation on the software switch 66 is changed by an operation on the operation panel 68 for each analyzing unit 60 in the previous embodiment, the control-and-processing unit 90 may also have the function of simultaneously changing the setting for enabling or disabling the operation on the software switches 66 of all analyzing units 60 via the system controller 80.

[Modes]

A person skilled in the art can understand that the previously described illustrative embodiments are specific examples of the following modes of the present invention.

(Clause 1)

One mode of the analyzer according to the present invention includes:

a system controller;

a plurality of analyzing units, with each analyzing unit including a main power switch configured to turn on and off electric power to the analyzing unit, and a software switch provided separately from the main power switch and configured to turn on and off a communication with the system controller; and a software-switch operation-mode setter configured to perform a setting for enabling or disabling an operation on the software switch included in each analyzing unit.

The analyzer according to Clause 1 includes a system controller, a plurality of analyzing units to be connected to the system controller and a software-switch operation-mode setter. When a measurement using this analyzer is to be performed, an analysis operator checks whether or not a communication has been established between the system controller and each of the analyzing units to be used for the measurement. When the communication with any one of those analyzing units has not been established, the analysis operator enables the operation on the software switch in the analyzing unit concerned by the software-switch operation-mode setter, and subsequently operates the software switch of the same analyzing unit to establish its communication with the system controller. For an analyzing unit which will not be used in the measurement, the analysis operator similarly enables the operation on the software switch in the analyzing unit concerned by the software-switch operation-mode setter, and subsequently operates the software switch of the same analyzing unit to block its communication with the system controller.

The analyzer according to Clause 1 allows the user to conveniently change the configuration of each analyzing unit by simply establishing a communication with the system controller by operating the software-switch operation-mode setter and the software switch (or blocking the communication between an unused analyzing unit and the system controller by operating the software switch of the same unit), without requiring the cable connections between the analyzing units and the system controller to be changed or requiring a manual operation of the main power supply of an analyzing unit located in an area that is inaccessible for manual operation. A skillful operator can perform a setting for enabling an input operation on the software switch when a measurement using a different combination of analyzing units is to be performed, or a setting for disabling an input operation on the software switch when a measurement using a previously determined combination of the analyzing units is to be performed by an insufficiently skilled operator. By this setting, an incorrect operation of the software switch by an insufficiently skilled operator can be avoided.

(Clause 2)

The analyzer according to Clause 1 may further include:

a communication state indicator provided in each of the plurality of analyzing units and configured to indicate an ON/OFF state of the communication between the analyzing unit concerned and the system controller.

The analyzer according to Clause 2 allows the user to conveniently recognize the communication state between each analyzing unit and the system controller.

(Clause 3)

In the analyzer according to Clause 1 or 2, each of the plurality of analyzing units may further include a software-switch state indicator configured to indicate whether an operation on the software switch of the analyzing unit concerned is enabled or disabled.

The analyzer according to Clause 3 allows the user to conveniently check whether an operation on the software switch of the analyzing unit concerned is enabled or disabled, by checking the software-switch state indicator.

(Clause 4)

In the analyzer according to one of Clauses 1-3, some or all of the plurality of analyzing units may be capable of operating in a normal mode and in a power-saving mode, and the system controller may include a power-saving mode setter configured to send, to at least one analyzing unit among the some or all of the analyzing units, a first control signal for causing the at least one analyzing unit to operate in the power-saving mode, in response to a first predetermined input given from the outside, as well as to send, to at least one analyzing unit among the some or all of the analyzing units, a second control signal for causing the at least one analyzing unit to operate in the normal mode, in response to a second predetermined input given from the outside.

(Clause 5)

In the analyzer according to Clause 4, each of the some or all of the analyzing units may further include an operation mode indicator configured to indicate whether an operation mode of the analyzing unit concerned is the power-saving mode or the normal mode.

In the analyzer according to Clause 4, one or more analyzing units can be operated in the power-saving mode under the control of the system controller so as to reduce the power consumption during a waiting time for an analysis or other periods of time. The analyzer according to Clause 5 allows the user to conveniently check whether the analyzing unit is operating in the power-saving mode or the normal mode, by checking the operation mode indicator.

(Clause 6)

The analyzer according to one of Clauses 1-5 may be a liquid chromatograph including, as the plurality of analyzing units, at least one analyzing unit selected from the group consisting of a liquid-sending unit, an autosampler, a column oven, and a detection unit.

As described in Clause 6, the configuration of the analyzer according to any one of Clauses 1-5 is suitably applicable in a liquid chromatograph.

REFERENCE SIGNS LIST

1 . . . Liquid Chromatograph
10 . . . Liquid-Sending Unit
111, 112 . . . Container
121, 122 . . . Liquid-Sending Pump
13 . . . Mixer
20 . . . Autosampler
21 . . . Temperature Regulator
30 . . . Column Oven
31 . . . Column
32 . . . Temperature Regulator
40 . . . Absorbance Detector
50 . . . Differential Refractive Index Detector
60 . . . Analyzing Unit
61 . . . Main Section
62 . . . Unit Controller
63 . . . First Power Source
64 . . . Second Power Source
65 . . . Software-Switch Operation-Mode Setter
66 . . . Software Switch
67 . . . Display
68 . . . Operation Panel
69 . . . Indicator
70 . . . Main Power Switch
80 . . . System Controller
90 . . . Control-and-Processing Unit
91 . . . Storage Section
92 . . . Measurement Condition Setter
93 . . . Measurement Controller
94 . . . Device Configuration Acquirer
95 . . . Power-Saving Mode Setter
96 . . . Input Unit
97 . . . Display Unit
100 . . . Passage
110 . . . Communication Cable

The invention claimed is:

1. A unit-type analyzer, comprising:
a system controller configured to communicate with a plurality of analyzing units by sending commands and receiving responses from the plurality of analyzing units; and
the plurality of analyzing units, with each analyzing unit including:
a main power switch configured to turn on and off electric power to the analyzing unit;
a software switch provided separately from the main power switch and configured to turn on and off communication with the system controller based on user input; and
a unit controller configured to:

when the software switch turns on communication with the system controller, receive and respond to commands sent from the system controller; and
when the software switch turns off communication with the system controller, refrain from responding to commands sent from the system controller.

2. The analyzer according to claim 1, further comprising:
a communication state indicator provided in each of the plurality of analyzing units and configured to indicate an ON/OFF state of the communication between the analyzing unit concerned and the system controller.

3. The analyzer according to claim 1, wherein:
each of the plurality of analyzing units further includes a software-switch state indicator configured to indicate whether an operation on the software switch of the analyzing unit concerned is enabled or disabled.

4. The analyzer according to claim 1, wherein:
some or all of the plurality of analyzing units are capable of operating in a normal mode and in a power-saving mode; and
the analyzer further comprises
a computer configured to send, to at least one analyzing unit among the some or all of the analyzing units, a first control signal for causing the at least one analyzing unit to operate in the power-saving mode, in response to a first predetermined input given from an outside, as well as to send, to at least one analyzing unit among the some or all of the analyzing units, a second control signal for causing the at least one analyzing unit to operate in the normal mode, in response to a second predetermined input given from an outside.

5. The analyzer according to claim 4, wherein:
each of the some or all of the analyzing units further includes an operation mode indicator configured to indicate whether an operation mode of the analyzing unit concerned is the power-saving mode or the normal mode.

6. The analyzer according to claim 1, wherein:
the analyzer is a liquid chromatograph including, as the plurality of analyzing units, at least one analyzing unit selected from the group consisting of a liquid-sending unit, an autosampler, a column oven, and a detection unit.

7. The analyzer according to claim 1, wherein
each of the plurality of analyzing units further includes an operation panel through which switches a first state where a user input to the software switch is valid and a second state where a user input to the software switch is invalid.

8. A unit-type analyzer, comprising:
a system controller configured to communicate with a plurality of analyzing units by sending commands and receiving responses from the plurality of analyzing units; and
the plurality of analyzing units, with each analyzing unit including:
a main power switch configured to turn on and off electric power to the analyzing unit;
a software switch provided separately from the main power switch and configured to turn on and off communication with the system controller based on user input;
a unit controller configured to:
when the software switch turns on communication with the system controller, receive and respond to commands sent from the system controller; and when the software switch turns off communication
    with the system controller, refrain from respond-
    ing to commands sent from the system controller;
    and
a computer configured to collectively perform a setting
    for enabling or disabling an operation on the software
    switch included in each of the plurality of analyzing
    unit.

* * * * *